United States Patent
Gomez Cordon et al.

(10) Patent No.: US 10,934,416 B2
(45) Date of Patent: Mar. 2, 2021

(54) ANTI-STATIC BICOMPONENT FORMULATION FOR UNSATURATED POLYESTER RESINS AND EPOXY VINYL ESTER RESINS

(71) Applicant: AVANZARE INNOVACION TECNOLOGICA S.L., Logroño (ES)

(72) Inventors: Julio Gomez Cordon, Logroño (ES); Luis Otaño Jimenez, Logroño (ES); Javier Perez Martinez, Logroño (ES)

(73) Assignee: AVANZARE INNOVACION TECNOLOGICA S.L., Logroño (ES)

( * ) Notice: Subject to any disclaimer, the term of this patent is extended or adjusted under 35 U.S.C. 154(b) by 270 days.

(21) Appl. No.: 15/756,194

(22) PCT Filed: Aug. 24, 2016

(86) PCT No.: PCT/ES2016/070608
§ 371 (c)(1),
(2) Date: Feb. 28, 2018

(87) PCT Pub. No.: WO2017/037317
PCT Pub. Date: Mar. 9, 2017

(65) Prior Publication Data
US 2018/0244900 A1  Aug. 30, 2018

(30) Foreign Application Priority Data
Aug. 31, 2015 (ES) .................. P201500656

(51) Int. Cl.
| | | |
|---|---|---|
| C08K 9/10 | (2006.01) | |
| C09K 3/16 | (2006.01) | |
| C08K 5/19 | (2006.01) | |
| C08K 3/16 | (2006.01) | |
| C08L 67/06 | (2006.01) | |
| C08L 63/00 | (2006.01) | |
| C08K 3/22 | (2006.01) | |
| C08K 3/26 | (2006.01) | |
| C08K 3/36 | (2006.01) | |
| C08K 3/34 | (2006.01) | |
| C08K 9/12 | (2006.01) | |
| C09D 7/61 | (2018.01) | |
| C09D 7/63 | (2018.01) | |
| C09D 5/24 | (2006.01) | |
| C09D 133/08 | (2006.01) | |
| C09D 133/14 | (2006.01) | |

(52) U.S. Cl.
CPC .............. *C08K 9/10* (2013.01); *C08K 3/16* (2013.01); *C08K 3/22* (2013.01); *C08K 3/26* (2013.01); *C08K 3/34* (2013.01); *C08K 3/346* (2013.01); *C08K 3/36* (2013.01); *C08K 5/19* (2013.01); *C08K 9/12* (2013.01); *C08L 63/00* (2013.01); *C08L 67/06* (2013.01); *C09D 5/24* (2013.01); *C09D 7/61* (2018.01); *C09D 7/63* (2018.01); *C09D 133/08* (2013.01); *C09D 133/14* (2013.01); *C09K 3/16* (2013.01); *C08K 2201/001* (2013.01); *C08K 2201/006* (2013.01); *C08K 2201/019* (2013.01)

(58) Field of Classification Search
CPC .................................... C08K 9/10; C08K 9/12
See application file for complete search history.

(56) References Cited

U.S. PATENT DOCUMENTS

| | | | |
|---|---|---|---|
| 3,912,841 A | 10/1975 | Payne et al. | |
| 4,046,859 A * | 9/1977 | Plank ...................... | B01J 23/30 423/707 |
| 4,526,583 A * | 7/1985 | Gioffre ................ | C11D 3/0031 8/137 |
| 4,589,988 A * | 5/1986 | Rieck ................... | C11D 3/1273 510/330 |

FOREIGN PATENT DOCUMENTS

| | | |
|---|---|---|
| CN | 103030959 A | 4/2013 |
| CN | 104087135 A | 10/2014 |
| EP | 0136478 A1 | 4/1985 |
| GB | 2124644 A | 2/1984 |

OTHER PUBLICATIONS

Li et al., Journal of Dental Research, "Effects of Quaternary Ammonium Chain Length on Antibacterial Bonding Agents", J Dent Res 2013 92: 932 originally published online Aug. 19, 2013, 8 pages.

Ren et al., Colloids and Surfaces A 556, "Synthesis and characterization of quaternary ammonium based ionic liquids and its antistatic applications for diesel", (2018) p. 239-247.

International Search Report dated Sep. 21, 2016 re: Application No. PCT/ES2016/070608; pp. 1-3; GB 2124644 A, EP 0136478 A1, U.S. Pat. No. 3,912,841 A, CN 103030959 A and CN 104087135 A.

(Continued)

*Primary Examiner* — Vickey Nerangis
(74) *Attorney, Agent, or Firm* — Cantor Colburn LLP

(57) ABSTRACT

A formulation based on two components, which, when added to items produced with epoxy vinyl ester or unsaturated polyester resin, provides the formulation with electric charge dissipation and/or antistatic characteristics, maintaining the mechanical characteristics thereof and the possibility of dyeing the material in all of the possible colour ranges includes a first component which is an active substance which is an ionic salt that allows ion mobility. The cation is a compound based on the (R4)N,N,N-trialkyl-alkyl-ol-ammonium species, as it is or derivatised on the OH group, and a system that supports said active substance. This additive or formulation added to epoxy vinyl ester or unsaturated polyester resin can be used in the production of agglomerated stone, gel coat, sheet moulding composite or bulk moulding composite.

17 Claims, No Drawings

(56) References Cited

OTHER PUBLICATIONS

Written Opinion dated Sep. 21, 2016 re: Application No. PCT/ES2016/070608; pp. 1-5; GB 2124644 A, EP 0136478 A1, U.S. Pat. No. 3,912,841 A, CN 103030959 A and CN 104087135 A.
Food and Agriculture Organization of the United Nations, World Health Organization, "Sodium Aluminum Silicate", Residue Monograph prepared by the meeting of the Joint FAO/WHO Expert Committee on Food Additives (JECFA), 84th meeting, 2017, 4 pages.
Smit et al., "Effects of Chain Length of Surfactants on the Interfacial Tension: Molecular Dynamics Simulations and Experiments", J. Phys. Chem. 1990, 94, 6933-6935.

* cited by examiner

ANTI-STATIC BICOMPONENT FORMULATION FOR UNSATURATED POLYESTER RESINS AND EPOXY VINYL ESTER RESINS

TECHNICAL FIELD

The present disclosure relates to a new formulation and the production process thereof, which, when added to items produced with epoxy vinyl ester or unsaturated polyester resin, provides these items with anti-static and/or electric charge dissipation characteristics, maintaining the mechanical characteristics thereof and the possibility of dyeing the material in all of the possible colour ranges.

BACKGROUND

Traditionally, items produced with unsaturated polyester or epoxy vinyl ester have the problem of static charge build-up on the surface thereof, due to the high surface resistance and mass resistance they have, with resistance values at 20° C. of above $10^{12}$ Ω·m. The build-up of charges causes harmful effects such as electric shocks on people, materials, fuels and electronic systems, among others. In general, the build-up of electric charges takes place in these materials when they are subjected to friction, for example by people passing by or even by the effects of the wind which contains dust and sand particles. This effect limits the uses of materials produced with the aforementioned thermostable resins.

The solutions proposed to prevent this charge build-up effect are classified into three groups:

Addition of molecules to the resin that become part of the polymer, providing greater electric conductivity to the items produced with the same. The patent JPH02281071A proposes the use of a maleimide containing a quaternary amine group and an anion bonded to said chemical group. This type of solution has the disadvantage that the mechanical characteristics of the material worsen in comparison to composites to which additives have not been added to the polymer in order to achieve greater electric conductivity since the polymerisation of the anti-static additive, derived from maleimide, is different to that of the reactive solvent typically used in unsaturated polyesters and epoxy vinyl ester resins.

It is well-known in scientific literature that electric conductivity in ionic conductors depends on the concentration and mobility of the cation and the anion. In this case, the cation derived from the maleimide loses its mobility due to the polymerisation reaction, under the effect thereof as an anti-static additive (see for example Specialty Polymers: Materials and Applications. 2007. Ch. 13 Ion conductive Polymers. A. Kumar, D. Salkia and Molecular mobility and Li+ conduction in polyester copolymer ionomers based on polyethylene oxide. D. Fragiadakis, Sh. Dou, R. H. Colby, J. Runt The journal of chemical physics, 2009, 130, 064907).

The patent GB1127925 proposes the use of sulphonation reactions of the surface of unsaturated polyester textile fibres with sulphurous derivatives. This type of material has a weak anti-static effect due to the low reactivity of the sulphurous derivatives with the unsaturated polyesters and the stability thereof over time is very short due to the fact that the effect only takes place on the surface of the textile fibres and is quickly lost.

The patent JPS63110242A presents the use of quaternary ammonium salts of the R1R2R3R4N* type and an $R_5SO_3$ type anion, R1, R2, R3 and $R^4$ being hydrogen or a saturated alkyl group with 1 to 24 carbons. These types of salt cause only small increases in electric conductivity in the material, but they especially produce a large deterioration of the mechanical characteristics of the pieces that contain them.

These salts on their own, among others, have a recognised effect of increasing the viscosity when they are added on the unsaturated polyester or epoxy vinyl ester resins as stated in the U.S. Pat. Nos. 4,425,287 and 3,538,188.

It is also known that the quaternary ammonium salts produce modifications in the polymerisation of unsaturated polyester systems, since they affect the activators. (Unsaturated Polyester Technology. 1976. Ed P. F. Bruins).

The direct addition of ionic, organic and inorganic salts on the resin also produces the accumulation thereof on points of the finished final piece due to the fact that these salts are not completely soluble in the resins and these points in turn create areas with worse mechanical characteristics and areas dyed with different colours that make the pieces produced invalid for the uses for which they were intended.

Addition of carbon-based conductive solids, for example lampblack or acetylene black, as described in the applications WO 2006/072553 A1, GB771559 (A), JPS552148587, CN1876714 A or CN1803918 A. These solutions have two disadvantages: due to the fact that the materials derived from carbon act as free radical scavengers, mechanical properties are lost during the polymerisation reaction of the thermostable resins; and mainly due to the fact that the carbon-based materials are black, this limits the chromatic possibilities of the articles produced.

Addition of conductive solids based on metals, conductive metal oxides or silicon carbide in the form of powder or granules as described in the patents ES 2320839 and U.S. Pat. No. 4,853,155A or in the form of metal fibres or threads as described in U.S. Pat. No. 3,996,167 and WO2013120719A1. These solutions have a new disadvantage: due to the large size of the added solids, large amounts of the same must be added to the final material in order to reduce the electrical resistance. In turn, this high requirement of conductive solids significantly modifies the final properties of the product obtained and notably limits the chromatic possibilities thereof since the same are visible.

Therefore, there is still the need in the state of the art to provide a formulation or additive that enables anti-static objects and materials and/or that dissipate electric charge built-up in unsaturated polyester resins and epoxy vinyl ester resins that have not lost mechanical properties or chromatic possibilities.

DETAILED DESCRIPTION

The present disclosure produces an additive or formulation based on two components, an ionic salt with specific characteristics and an encapsulant/dispersant of said ionic salt. The use of this second compound has the purpose of preventing the loss of mechanical properties and chromatic possibilities and improving the dispersion of the ionic slat.

Once the additive or formulation is prepared, it is added on unsaturated polyester and epoxy vinyl ester resins during the production process thereof and provides the same with anti-static and electric charge dissipation characteristics for the objects produced that contain this formulation.

The additive or formulation can be used in processes for producing agglomerated stone, sheet moulding composite (SMC) material, bulk moulding composite (BMC) material and/or gel coat, thus enabling panels, blocks, tiles, planes or structures of this type to be obtained, which can be dyed in any colour range, with optimal mechanical performance.

The pieces produced can be used in construction, decoration, furniture and construction of transport equipment.

DESCRIPTION

The unsaturated polyester resins are polymers with respect to which there is extensive knowledge on the state of the art. They are made up of polyester chains formed by glycols and/or polyols esterified with dicarboxylic or polycarboxylic acids or anhydrides.

The preferred glycol is propylene glycol, but others such as ethylene glycol, diethylene glycol, neopentyl glycol, and other diols or polyols known in the state of the art can be used.

The unsaturated polycarboxylic acids can be maleic acid, fumaric acid, maleic anhydride or others and mixtures of these compounds.

Furthermore, in the production of unsaturated polyester resins, other polycarboxylic acids are added, such as phthalic anhydride, isophthalic acid, itaconic acid, dicarboxylic cyclohexane acid, terephthalic acid, adipic acid, sebacic acid, azelaic acid and glutaric acid, and any other acid according to the state of the art.

The total amount of acid or anhydride varies depending on the characteristics required of the formed unsaturated polyester.

Dicyclopentadiene can be added to the resins. The report by P. L. Smith et al. "La utilización de diciclopentadieno en poliésteres" [*The use of dicyclopentadiene in polyesters*] Actas de la 2ª Conferencia Técnica Annual. Sociedad de la Industria de Plásticos, División de Plásticos Reforzados, Washington, D.C. (1967) describes the modification of polyesters with dicyclopentadiene. Once the resin has been formed, it is diluted in a reactive diluent in proportions that range between 20 and 60% and can be: styrene, methyl methacrylate, butyl methacrylate, other methacrylates, acrylates, vinyl toluene, para-methylstyrene, divinylbenzene, diallyl phthalate, vinyl derivatives including mixtures thereof and other diluents known in the state of the art.

Furthermore, other additives are incorporated such as suitable curing agents, low profile additives, accelerating agents and the like.

Normally, strengthening agents are added for the final use, such as fibreglass and inert additives such as quartz, cristobalite, aluminium trihydroxide, glass, metal loads, wood loads, calcium carbonate, sand or clay, among others. When necessary, desirable or convenient, pigments, demoulding agents, plasticizers and the like are also conventionally used. The manner in which these polyester resin compositions are made is well known in the state of the art.

Epoxy vinyl ester resins are polymers with respect to which there is extensive knowledge on the state of the art.

These can be different types of polymer chains such as epoxy bisphenol A, epoxy bisphenol F or novolacs. All or some of the epoxy groups of the polymer react with an agent that introduces an ester group and an unsaturation at least at each end of the chain, methacrylic acid being preferred for this function and other unsaturated monocarboxylic acids can be used such as acrylic acid and crotonic acid.

Once the resin has been formed, it is diluted in a reactive diluent in proportions that range between 20 and 60% and can be: styrene, methyl methacrylate, butyl methacrylate, other methacrylates, acrylates, vinyl toluene, para-methylstyrene, divinylbenzene, diallyl phthalate, vinyl derivatives including mixtures thereof and other diluents known in the state of the art.

Furthermore, other additives are incorporated such as suitable curing agents, low profile additives, accelerating agents and the like.

Normally, strengthening agents are added for the final use, such as fibreglass and inert additives and loads such as quartz, cristobalite, aluminium trihydroxide, glass, metal loads, wood loads and inorganic loads such as calcium carbonate, sand or clay, among others. When necessary, desirable or convenient, pigments, demoulding agents, plasticizers and the like are also conventionally used.

This disclosure can also be applied to resins of the previous modified types, for example with isocyanates or to mixtures thereof that are well known in the state of the art.

The mixtures obtained based on unsaturated polyester or epoxy vinyl ester or the modifications thereof, are worked in several ways:

Agglomerated stone, which enables the production of panels, blocks or tiles, are composite materials formed by resins and additives to which mineral loads are added.

The inorganic load used can comprise, for example, a mixture of crushed materials with a grain size that ranges between several centimeters to very few microns and can have one or several materials. The materials can be, among others, quartz, marble, dolomite, silica, crystal, mirror, cristobalite, granite, feldspar, basalt, glass, various sands and mixtures thereof. The inorganic load is either obtained commercially or by selecting and crushing the inorganic starting materials until the desired grain size and mixing them in the proportions suitable for obtaining an optimal packaging of the material and a final appearance that is appropriate for the use for which it is required.

The resin formulated with the previously homogenised components and additives thereof is mixed with the mineral load.

The formed mass is treated by the processes applied in the state of the art and is deposited on moulds that are open on two faces.

Vibro-compression under vacuum is carried out on the mixture.

The formed materials move to a thermal heating stage in specific ovens.

Once the mass has been hardened by means of heat application, the item obtained is subjected to a series of processes that comprise cooling the product obtained and carrying out mechanical treatments such as calibration, polishing and cutting according to the desired final dimensions of the pieces that are to be used. The shapes are mainly flat but other, more complex shapes can be obtained.

Sheets produced of the sheet moulding composite (SMC) material or bulk moulding composite (BMC) material, are materials obtained from the unsaturated polyester or epoxy vinyl ester resins described above and which are produced by means of a homogeneous mixture of glass fibre, mineral loads and thermostable unsaturated polyester or epoxy vinyl ester resin, with the addition of coupling agents, cross-linking activators, pigments and produced by high pressure compression, heating and demoulding.

Various mineral loads are added to the resins in the form of powder with a fine grain size such as aluminium trihydroxide, quartz, silica, pigments, and they are mixed.

For sheet moulding composite (SMC) materials, the material is laminated between plastic sheets. Once the sheets are formed, they can be stored for subsequent use.

For bulk moulding composite (BMC) materials, the material is inserted in the mould from a mass.

In order to obtain the final material, the sheets or mass are inserted into a press that works at high pressure and subjects the material to heating. The mould can have different shapes.

The resin polymerises and hardens due to the effect of the temperature and pieces of SMC or BMC materials are obtained.

Gel coats are obtained by means of the homogeneous mixture of mineral loads, and thermostable unsaturated polyester or epoxy vinyl ester resin, with the addition of coupling agents, polymerisation activators, pigments, thickeners and others and produced by mould deposition. These are coatings of 0.1 to 1 mm thick of unsaturated polyester or epoxy vinyl ester resin that are applied in one or several layers on the surface of a mould and that serve as a superficial protective surface of the main body of the piece that is mainly produced from new in unsaturated polyester or epoxy vinyl ester applied by casting on the layer of gel coat.

The gel coat is deposited on the mould by painting with a brush, roller or by spray gun, among others.

A gel coat contains a base resin, preferably with good performance for resisting the use that the piece will be given in different types of environments, a reactive diluent, mainly styrene, silica fume, precipitated silica or a mixture of both to adjust the rheology of the product and pigments when the surface of the product needs to be dyed. The gel coat is polymerised by a system formed by peroxides and cobalt or amine accelerators.

In addition, the gel coat normally contains inorganic loads. The most commonly used loads are precipitated calcium carbonate and micronized talc. The self-extinguishing gel coat can be prepared with alumina trihydrate.

In order to facilitate the handling of the gel coat, it is used by mixing with solvents that are classified in two categories:

The first includes non-copolymerisable viscosity reducers, which serve to reduce the viscosity of the gel coat for gun application. They must have the main characteristic of an extremely fast evaporation level, preferably that completely evaporate before the gel coat reaches the surface of the mould. Acetone is generally used for this purpose. Approximately 3 to 5% acetone reduces the viscosity of the gel coat to provide values compatible with spray gun application.

The second category includes copolymerisable solvents, which form an integral part of the cured gel coat.

Other components of the gel coat are polymerisation inhibiting agents that generally contain the resin in order to facilitate the preservation thereof before use and active substances, such as UV protectors.

The formulation presented can also be used in other production methods applicable to unsaturated polyester and epoxy vinyl ester resins, such as mass mould deposition, contact moulding, simultaneous spray moulding, vacuum moulding, compression moulding, filament winding, pultrusion and the various modifications thereof that are widely known in the state of the art.

All these different materials thus produced are very bad electrical conductors and when they are subjected to friction by different materials (shoe soles, dust in the wind, etc.) they have a strong tendency to become electrically charged, finally resulting in the production of electric shocks on materials and people causing unpleasant effects to accidents related to fires and explosions. This effect limits or prevents the use of these materials in floors, facades or panels in transport equipment, etc.

In the present disclosure, a formulation free of conductive polymers, metals, carbon-based conductive materials, such as lampblack, carbon fibres, graphite, graphene or carbon nanotubes is obtained, which provides an anti-static and/or electric charge dissipation effect in the application thereof in thermostable unsaturated polyester resins or in thermostable epoxy vinyl ester resins and wherein the presence of two components is necessary so that the first component can disperse in the polymer matrix thus preventing the loss of mechanical and aesthetic properties, also preventing the formation of agglomerates or the reaction with the components of the resin, the purpose of which is to increase the electrical conductivity of the materials described above and prevent the build-up of electric charges on the surface thereof without losing the mechanical properties and chromatic possibilities.

The formulation of the present disclosure has two components which are:

The active substance, which will enable the mobility of the ions on the surface and/or the interior of the material and, therefore, the mobility of electric charges, giving rise to the conductive and electric charge dissipation effect.

A system that supports said active substance and enables the addition to the composites described above, such that the presence of this active substance and the long-term effect thereof is maintained, the thickening effect is prevented and preventing the active substance from interfering in the polymerisation reactions during the production of the pieces. It also prevents the loss of mechanical properties and the loss of chromatic possibilities, since it is not a black or coloured additive and does not create patches and accumulations due to the low solubility of the ionic salt in the polymer matrix.

The active substance, first component, is a salt formed by a cation and an anion.

The cation is a compound based on the cation N,N,N-trialkyl-alkyl-ol-ammonium, as it is or derivatised on the OH group, as expressed in the following chemical formula:

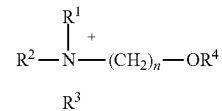

$R^1$, $R^2$ and $R^3$ can be —$CH_3$, —$CH_2CH_3$, —$CH_2CH_2CH_3$ or —$CH_2CH_2CH_2CH_3$ N can be 1, 2 or 3 and $OR^4$ can be hydroxyl or an organic acid derivative. The most common derivatives can be formyl, acetyl, propanoyl, butanoyl, hexanoyl, octanoyl, 2-ethylhexanoyl, decanoyl, dodecanoyl, tetradecanoyl, hexadecanoyl, stearoyl, oleoyl or benzoyl.

The anion of said salt is inorganic or organic, possibly being: chloride, fluoride, bromide, iodide, perchlorate, sulphate, hydrogen sulphate, nitrate, nitrite, dihydrogen phosphate, hydrogen phosphate, phosphate, borate, carbonate, hydrogen carbonate, sulphocyanide, tetrafluoroborate, hexafluorophosphate, dicyanamide, sulfamate, acetate, propionate, butanoate, formate, oxalate, lactate, glycolate, benzoate, salicylate, citrate, tartrate, p-toluenesulfonate, xylenesulfonate, 2-ethylhexyl sulfate, octanesulfonate, methanesulfonate, ethanesulfonate, propanesulfonate, methosulfate (methyl sulfate), ethosulfate (ethyl sulfate), alkyl phosphates, aryl phosphates or saccharinate.

These active salts are known in scientific literature and can be commercially obtained or prepared by, for example, using the following methods:

In the case of the acid derivatives by cation reaction, the —$OR^4$ of which is —OH with acid anhydrides, for example, as indicated in U.S. Pat. No. 1,957,443A or other methods as indicated in U.S. Pat. No. 2,731,493A.

In turn, the different anions can be introduced into the salt based on a given salt with chloride anion with a silver derivative of the anion to be obtained in a suitable solvent, Renshaw, R. R.; Atkins, K. N. (1910) Preparation of choline and some of its salts Journal of the American Chemical Society Vol. 32 Issue 1, p. 128-130 or U.S. Pat. No. 7,320,803B2. Similarly, based on the initial salt with chloride anion, it can be treated by an alkali hydroxide in an alcohol solvent and adding to the result the acid of the new anion that is intended to be obtained in the final salt, as indicated in U.S. Pat. No. 2,589,707A.

Different salts can also be prepared with different anions by reaction of the hydroxide of the cation that is obtained by reaction of the ethylene oxide with trimethylamine, triethylamine or tributylamine or other amines in water or aqueous solvents and subsequently neutralising with the acid corresponding to the anion that is intended to be obtained in the final salt, for example, as indicated in GB379260A, U.S. Pat. No. 2,774,759 A or U.S. Pat. No. 2,870,198A.

As has been noted, the direct addition of the salt on the resin also produces thickening, negative modifications in the polymerisation reaction, poor dispersion and appearance of agglomerates, which entails the loss of mechanical properties, appearance of patches and loss of chromatic possibilities.

In order to prevent the thickening effect of the resin, achieve a homogeneous distribution over the piece produced and prevent the loss of mechanical and decorative properties, the salt must be encapsulated or pre-dispersed before it is added to the resin.

The second component is a support with high surface area that encapsulates, absorbs, adsorbs and/or protects the previous anion-cation group (salt), comprised among the following: sodium aluminosilicate, precipitated silica, silica fume, sepiolite, attapulgite, stevensite-kerolite, bentonites, ball clay, kaolinite, kaolin, metakaolin, halloysite, zeolites, $TiO_2$, alumina ($Al_2O_3$), boehmite, aluminium trihydroxide, magnesium hydroxide, magnesium oxide, calcium carbonate, magnesium carbonate, calcium carbonate and magnesium and/or the mixtures thereof.

Preferably, the support that encapsulates, absorbs, adsorbs and/or protects must have the following characteristics and is comprised among: precipitated silica with a specific surface area (BET) between 30 and 250 $m^2/gr$, silica fume 200-300 $m^2/gr$, sodium aluminosilicate (10 to 200 $m^2/gr$), sepiolite 0.01-100 μm, attapulgite 0.01-100 μm, stevensite-kerolite 0.01-100 μm, bentonites 0.01-100 μm, ball clay, kaolinite 0.01-100 μm, kaolin 0.01-100 μm, metakaolin 0.1-100 μm, halloysite, zeolite 0.01-100 μm, $TiO_2$ 0.01-100 μm, alumina 0.01-100 μm, boehmite 0.01-100 μm, aluminium trihydroxide 0.01-100 μm, magnesium hydroxide 0.01-100 μm, magnesium oxide 0.01-100 μm, calcium carbonate 0.01-100 μm, magnesium carbonate 0.01-100 μm, calcium carbonate and magnesium 0.01-100 μm and/or the mixtures thereof.

The support and interaction process between the two components is carried out in a dry medium, by means of intimate homogenisation of the salt used and the encapsulant due to the effect of mechanical action. The encapsulating effect is achieved when the active salt is distributed homogeneously over the surface of the encapsulant or in the inside thereof, being adsorbed by the material. For this purpose, among other forms, it can be achieved by means of the interaction of the components in a rapid mixer.

Alternatively, the encapsulation can be carried out by means of: a) simultaneous moulding of the salt and the encapsulating agent, b) by dissolving the salt in a suitable solvent, deposition thereof on the encapsulant and finally removal the solvent by distillation, evaporation, filtration or by other methods, the final result of which is a homogeneous distribution of the salt over the surface and/or the interior of the encapsulant.

The encapsulant provides its effect when the ionic compound is supported by the same and the preferable amount of the compound is of 1% to 40% by mass. Depending on the type of encapsulant used, the harmful effects on chromatic characteristics, appearance and mechanical properties of the final material appear as the proportion of ionic compound compared to encapsulant is increased. More preferably, the proportion of ionic compound in the formulation is between 5 and 25% and even more preferably between 10 and 20%.

The formulation formed by two components is added to the composite material by the same means, systems and at the same time as any other load or pigment is added. It can also be mixed with any inorganic load that is previously added to the material. If necessary, the formulation can be added on the mixture of liquid components of the resin.

The proportions of the formulation based on the 2 compounds to be added on the unsaturated polyester or epoxy vinyl ester are preferably established in proportion to the amount of liquid resin used and range between 1% and 19%, preferably between 2 and 15% and more preferably between 5 and 10% of formulation per unit of resin. This proportion depends on the level of electric conductivity that is to be obtained in the final material.

Example 1

Encapsulation preparation of a salt of $(R_4)$N,N,N-trialkyl-alkyl-ol-ammonium wherein $R^1$, $R^2$, $R^3$ are $CH_3$; n=2 and $OR^4$ is OH and the anion is chloride (choline chloride) at 5% in precipitated sodium aluminosilicate 95%.

950 gr of sodium aluminosilicate is used, preferably it must have a composition of 10 to 14.5 ($SiO_2$), 0.5 to 1.5 ($Al_2O_3$), 0.5 to 2 ($Na_2O$) and surface BET surface 50 to 90 $m^2/gr$, for this example we use 14.5 ($SiO_2$).$Al_2O_3$.1.4 ($Na_2O$) BET 60 $m^2/gr$ fine powder obtained by precipitation. 50 gr of the salt, choline chloride, powder is added. It is encapsulated by mixing at high revolutions in a rapid turbo-mixer at 2500 rpm for 10 minutes.

Example 2

Preparation as in example 1, wherein the ratio is 10%-90%.

900 gr of sodium aluminosilicate is used, 14.5 ($SiO_2$). $Al_2O_3$.1.4 ($Na_2O$) BET 60 $m^2/gr$ fine powder obtained by precipitation. 100 gr of choline chloride powder is added. It is encapsulated by mixing at high revolutions in a rapid turbo-mixer at 2500 rpm for 10 minutes.

Example 3

Preparation as in example 1, wherein the ratio is 15%-85%.

850 gr of sodium aluminosilicate is used, 14.5 ($SiO_2$). $Al_2O_3$.1.4 ($Na_2O$) BET 60 $m^2/gr$ fine powder obtained by precipitation. 150 gr of choline chloride powder is added. It is encapsulated by mixing at high revolutions in a rapid turbo-mixer at 2500 rpm for 10 minutes.

Example 4

Encapsulation preparation of a salt of $(R_4)$N,N,N-trialkyl-alkyl-ol-ammonium wherein $R^1$, $R^2$, $R^3$ are $CH_3$; n=2 and $OR^4$ is OH and the anion is bromide (choline bromide) at 10% in sepiolite.

900 gr of sepiolite is used, BET 320 $m^2$/gr fine powder obtained by grinding in humid medium. 100 gr of choline bromide powder is added. It is encapsulated by mixing at high revolutions in a rapid turbo-mixer at 2500 rpm for 10 minutes.

Example 5

Encapsulation preparation $(R_4)$N,N,N-trialkyl-alkyl-ol-ammonium wherein $R^1$, $R^2$, $R^3$ are $CH_3$; n=2 and $OR^4$ is OH and the anion is chloride (choline chloride) at 10% in attapulgite.

970 gr of attapulgite is used, BET 200 $m^2$/gr fine powder obtained by grinding in dry medium. 30 gr of choline chloride powder is added. It is encapsulated by mixing at high revolutions in a rapid turbo-mixer at 2500 rpm for 10 minutes.

Example 6

Encapsulation preparation $(R_4)$N,N,N-trialkyl-alkyl-ol-ammonium wherein $R^1$, $R^2$, $R^3$ are $CH_3$; n=2 and $OR^4$ is OH and the anion is chloride (choline chloride) at 10% in halloysite.

900 gr of halloysite is used, BET 200 $m^2$/gr fine powder obtained by grinding in dry medium. 100 gr of choline chloride powder is added. It is encapsulated by mixing at high revolutions in a rapid turbo-mixer at 2500 rpm for 10 minutes.

Example 7

Encapsulation preparation $(R_4)$N,N,N-trialkyl-alkyl-ol-ammonium wherein $R^1$, $R^2$, $R^3$ are $CH_3$; n=2 and $OR^4$ is OH and the anion is formate (choline formate) at 10% in stevensite-kerolite.

900 gr of stevensite-kerolite is used, BET 200 $m^2$/gr fine powder obtained by grinding in dry medium. 100 gr of choline formate in powder is added. It is encapsulated by mixing at high revolutions in a rapid turbo-mixer at 2500 rpm for 10 minutes.

Example 8

Encapsulation preparation $(R_4)$N,N,N-trialkyl-alkyl-ol-ammonium wherein $R^1$, $R^2$, $R^3$ are $CH_3$; n=2 and $OR^4$ is OH and the anion is acetate (choline acetate) at 10% in activated sodium bentonite.

900 gr of activated sodium bentonite is used in fine powder obtained by activation in liquid medium, dried and ground in dry medium. 100 gr of choline acetate powder is added. It is encapsulated by mixing at high revolutions in a rapid turbo-mixer at 2500 rpm for 10 minutes.

Example 9

Encapsulation preparation $(R_4)$N,N,N-trialkyl-alkyl-ol-ammonium wherein $R^1$, $R^2$, $R^3$ are $CH_3$; n=2 and $OR^4$ is OH and the anion is acetate (choline acetate) at 10% in calcium bentonite.

900 gr of calcium bentonite is used in fine powder obtained by grinding in dry medium. 100 gr of choline acetate powder is added. It is encapsulated by mixing at high revolutions in a rapid turbo-mixer at 2500 rpm for 10 minutes.

Example 10

Encapsulation preparation $(R_4)$N,N,N-trialkyl-alkyl-ol-ammonium wherein $R^1$, $R^2$, $R^3$ are $CH_3$; n=2 and $OR^4$ is OH and the anion is methanesulfonate (choline methanesulfonate) at 10% in ball clay.

900 gr of ball clay is used in fine powder obtained by grinding in dry medium. 100 gr of choline methanesulfonate powder is added. It is encapsulated by mixing at high revolutions in a rapid turbo-mixer at 2500 rpm for 10 minutes.

Example 11

Encapsulation preparation $(R_4)$N,N,N-trialkyl-alkyl-ol-ammonium wherein $R^1$, $R^2$, $R^3$ are $CH_3$; n=2 and $OR^4$ is OH and the anion is chloride (choline chloride) at 10% in kaolin.

900 gr of micronised kaolin is used in fine powder obtained by grinding in dry medium. 50 gr of choline chloride powder is added. It is encapsulated by mixing at high revolutions in a rapid turbo-mixer at 2500 rpm for 10 minutes.

Example 12

Encapsulation preparation $(R_4)$N,N,N-trialkyl-alkyl-ol-ammonium wherein $R^1$, $R^2$, $R^3$ are $CH_3$; n=2 and $OR^4$ is OH and the anion is chloride (choline chloride) at 10% in metakaolin.

900 gr of micronised metakaolin is used in fine powder obtained by thermally treating kaolin and grinding in dry medium. 100 gr of choline chloride powder is added. It is encapsulated by mixing at high revolutions in a rapid turbo-mixer at 2500 rpm for 10 minutes.

Example 13

Encapsulation preparation $(R_4)$N,N,N-trialkyl-alkyl-ol-ammonium wherein $R^1$, $R^2$, $R^3$ are $CH_3$; n=2 and $OR^4$ is OH and the anion is chloride (choline chloride) at 10% in zeolite A.

900 gr of micronised zeolite A is used in fine powder obtained by precipitation and grinding in dry medium. 100 gr of choline chloride powder is added. It is encapsulated by mixing at high revolutions in a rapid turbo-mixer at 2500 rpm for 10 minutes.

Example 14

Encapsulation preparation $(R_4)$N,N,N-trialkyl-alkyl-ol-ammonium wherein $R^1$, $R^2$, $R^3$ are $CH_3$; n=2 and $OR^4$ is OH and the anion is chloride (choline chloride) at 10% in aluminium oxide (alumina).

900 gr of aluminium oxide (alumina) is used in fine powder less than 20 μm obtained by grinding in dry medium. 100 gr of choline chloride powder is added. It is encapsulated by mixing at high revolutions in a rapid turbo-mixer at 2500 rpm for 10 minutes.

Example 15

Encapsulation preparation $(R_4)$N,N,N-trialkyl-alkyl-ol-ammonium wherein $R^1$, $R^2$, $R^3$ are $CH_3$; n=2 and $OR^4$ is OH and the anion is chloride (choline chloride) at 10% in boehmite.

900 gr of boehmite is used in fine powder less than 30 μm obtained by grinding in dry medium. 100 gr of choline chloride powder is added. It is encapsulated by mixing at high revolutions in a rapid turbo-mixer at 2500 rpm for 10 minutes.

Example 16

Encapsulation preparation $(R_4)$N,N,N-trialkyl-alkyl-ol-ammonium wherein $R^1$, $R^2$, $R^3$ are $CH_3$; n=2 and $OR^4$ is OH and the anion is chloride (choline chloride) at 10% in aluminium trihydroxide.

900 gr of aluminium trihydroxide is used in fine powder less than 30 μm obtained by grinding in dry medium. 100 gr of choline chloride powder is added. It is encapsulated by mixing at high revolutions in a rapid turbo-mixer at 2500 rpm for 10 minutes.

Example 17

Encapsulation preparation N, N,N-trialkyl-alkyl-stearoyl-ammonium wherein $R^1$, $R^2$, $R^3$ are $CH_3$; n=2 and $OR^4$ according to the general formula of the compounds of the present disclosure is stearoyl and the anion is chloride (stearoyl choline chloride) at 10% in calcium carbonate.

900 gr of calcium carbonate is used in fine powder less than 5 μm obtained by grinding. 100 gr of stearoyl choline chloride powder is added. It is encapsulated by mixing at high revolutions in a rapid turbo-mixer at 2500 rpm for 10 minutes.

Example 18

Encapsulation preparation $(R_4)$N,N,N-trialkyl-alkyl-ol-ammonium wherein $R^1$, $R^2$, $R^3$ are $CH_3$; n=2 and $OR^4$ is OH and the anion is bromide (choline bromide) at 10% in sodium aluminosilicate and halloysite.

500 gr of sodium aluminosilicate is used, BET 60 $m^2$/gr. 400 gr of halloysite in fine powder is added. 100 gr of choline bromide powder is added. It is encapsulated by mixing at high revolutions in a rapid turbo-mixer at 2500 rpm for 10 minutes.

Example 19

Encapsulation preparation $(R_4)$N,N,N-trialkyl-alkyl-ol-ammonium wherein $R^1$, $R^2$, $R^3$ are $CH_3$; n=2 and $OR^4$ is OH and the anion is chloride (choline chloride) at 10% in precipitated silica 100 BET $m^2$/gr.

900 gr of precipitated silica BET 100 $m^2$/gr is used. 100 gr of choline chloride powder is added. It is encapsulated by mixing at high revolutions in a rapid turbo-mixer at 2500 rpm for 10 minutes.

Example 20

Encapsulation preparation $(R_4)$N,N,N-trialkyl-alkyl-ol-ammonium wherein $R^1$, $R^2$, $R^3$ are $CH_3$; n=2 and $OR^4$ is OH and the anion is chloride (choline chloride) at 10% in titanium dioxide ($TiO_2$).

900 gr of titanium dioxide ($TiO_2$) with a size of less than 5 μm is used. 100 gr of choline chloride powder is added. It is encapsulated by mixing at high revolutions in a rapid turbo-mixer at 2500 rpm for 10 minutes.

Example 21

Encapsulation preparation $(R_4)$N,N,N-trialkyl-alkyl-ol-ammonium wherein $R^1$, $R^2$, $R^3$ are $CH_3$; n=2 and $OR^4$ is OH and the anion is chloride (choline chloride) at 10% in magnesium hydroxide ($Mg(OH)_2$) with an average particle size of 5 μm.

900 gr of 5 μm magnesium hydroxide ($Mg(OH)_2$) is used. 100 gr of choline chloride powder is added. It is encapsulated by mixing at high revolutions in a rapid turbo-mixer at 2500 rpm for 10 minutes.

Example 22

Encapsulation preparation $(R_4)$N,N,N-trialkyl-alkyl-ol-ammonium wherein $R^1$, $R^2$, $R^3$ are $CH_3$; n=2 and $OR^4$ is OH and the anion is bromide (choline bromide) at 10% in magnesium hydroxide.

900 gr of magnesium hydroxide is used. 100 gr of choline bromide powder is added. It is encapsulated by mixing at high revolutions in a rapid turbo-mixer at 2500 rpm for 10 minutes.

Example 23

Encapsulation preparation $(R_4)$N,N,N-trialkyl-alkyl-ol-ammonium wherein $R^1$, $R^2$, $R^3$ are $CH_3$; n=2 and $OR^4$ is OH and the anion is ethyl sulfate (choline ethyl sulfate) at 10% in magnesium hydroxide.

900 gr of magnesium hydroxide is used. 100 gr of choline ethyl sulfate powder is added. It is encapsulated by mixing at high revolutions in a rapid turbo-mixer at 2500 rpm for 10 minutes.

Example 24

Encapsulation preparation $(R_4)$N,N,N-trialkyl-alkyl-ol-ammonium wherein $R^1$, $R^2$, $R^3$ are $CH_3$; n=2 and $OR^4$ is OH and the anion is methyl sulfate (choline methyl sulfate) at 10% in zeolite A.

900 gr of zeolite A is used. 100 gr of choline methyl sulfate powder is added. It is encapsulated by mixing at high revolutions in a rapid turbo-mixer at 2500 rpm for 10 minutes.

Example 25

Encapsulation preparation $(R_4)$N,N,N-trialkyl-alkyl-ol-ammonium wherein $R^1$, $R^2$, $R^3$ are $CH_3$; n=2 and $OR^4$ is OH and the anion is tetrafluoroborate (choline tetrafluoroborate) at 10% in calcium carbonate.

900 gr of calcium carbonate is used. 100 gr of choline tetrafluoroborate powder is added. It is encapsulated by mixing at high revolutions in a rapid turbo-mixer at 2500 rpm for 10 minutes.

Example 26

Encapsulation preparation $(R_4)$N,N,N-trialkyl-alkyl-ol-ammonium wherein $R^1$, $R^2$, $R^3$ are $CH_3$; n=2 and $OR^4$ is OH and the anion is acetate (choline acetate) at 10% in calcium carbonate.

900 gr of calcium carbonate is used. 100 gr of choline acetate powder is added. It is encapsulated by mixing at high revolutions in a rapid turbo-mixer at 2500 rpm for 10 minutes.

Example 27

Encapsulation preparation $(R_4)$N,N,N-trialkyl-alkyl-ol-ammonium wherein $R^1$, $R^2$, $R^3$ are $CH_3$; n=2 and $OR^4$ is OH and the anion is lactate (choline lactate) at 10% in precipitated silica.

900 gr of precipitated silica is used. 100 gr of choline lactate powder is added. It is encapsulated by mixing at high revolutions in a rapid turbo-mixer at 2500 rpm for 10 minutes.

Example 28

Encapsulation preparation $(R_4)$N,N,N-trialkyl-alkyl-ol-ammonium wherein $R^1$, $R^2$, $R^3$ are $CH_3$; n=2 and $OR^4$ is OH and the anion is 2H-1λ6,2-benzisothiazol-1,1,3-thionate (choline saccharinate) at 15% in precipitated silica.

900 gr of precipitated silica is used. 100 gr of choline saccharinate powder is added. It is encapsulated by mixing at high revolutions in a rapid turbo-mixer at 2500 rpm for 10 minutes.

Example 29

Encapsulation preparation N,N,N-trialkyl-alkyl acetyl-ammonium wherein $R^1$, $R^2$, $R^3$ are $CH_3$; n=2 and $OR^4$ according to the general formula of the compounds of the present disclosure is OC(=O)CH$_3$ and the anion is chloride (acetylcholine chloride) at 10% in precipitated silica.

900 gr of precipitated silica is used. 100 gr of acetylcholine chloride powder is added. It is encapsulated by mixing at high revolutions in a rapid turbo-mixer at 2500 rpm for 10 minutes.

Example 30

Encapsulation preparation $(R_4)$N, N, N-trialkyl-alkyl(n)-ol-ammonium wherein $R^1$, $R^2$, $R^3$ are $CH_2CH_3$; n=2 and $OR^4$ is OH and the anion is chloride at 10% in precipitated sodium aluminosilicate.

900 gr of sodium aluminosilicate 14.5 (SiO$_2$).Al$_2$O$_3$.1.4 (Na$_2$O) BET 60 m$^2$/gr fine powder obtained by precipitation is used. 100 gr of the salt powder is added. It is encapsulated by mixing at high revolutions in a rapid turbo-mixer at 2500 rpm for 10 minutes.

Example 31

Encapsulation preparation $(R_4)$N,N,N-trialkyl-alkyl-ol-ammonium wherein $R^1$, $R^2$, $R^3$ are $CH_2CH_2CH_3$; n=2 and $OR^4$ is OH and the anion is chloride at 10% in precipitated sodium aluminosilicate.

900 gr of sodium aluminosilicate 14.5 (SiO$_2$).Al$_2$O$_3$.1.4 (Na$_2$O) BET 60 m$^2$/gr fine powder obtained by precipitation is used. 100 gr of the salt powder is added. It is encapsulated by mixing at high revolutions in a rapid turbo-mixer at 2500 rpm for 10 minutes.

Example 32

Encapsulation preparation $(R_4)$N,N,N-trialkyl-alkyl-ol-ammonium wherein $R^1$, $R^2$, $R^3$ are $CH_3$; n=2 and $OR^4$ is OH and the anion is bromide (choline bromide) at 10% in precipitated silica.

900 gr of precipitated silica is used. 100 gr of choline bromide powder is added. It is encapsulated by mixing at high revolutions in a rapid turbo-mixer at 2500 rpm for 10 minutes.

Example 33

Encapsulation preparation N,N,N-trialkyl-acetyl alkyl-ammonium wherein $R^1$, $R^2$, $R^3$ are $CH_3$; n=2 and $OR^4$ according to the general formula of the compounds of the present disclosure is OC(=O)CH3 and the anion is ethyl sulfate (acetylcholine ethyl sulfate) at 10% in halloysite.

900 gr of halloysite is used. 100 gr of acetylcholine ethyl sulfate powder is added. It is encapsulated by mixing at high revolutions in a rapid turbo-mixer at 2500 rpm for 10 minutes.

Example 34

Encapsulation preparation N,N, N-trialkyl-2-ethyl-hexanoyl alkyl ammonium wherein $R^1$, $R^2$, $R^3$ are $CH_3$; n=2 and $OR^4$ according to the general formula of the compounds of the present disclosure is 2-ethylhexanoyl and the anion is ethyl sulfate (2-ethylhexanoyl choline ethyl sulfate) at 10% in precipitated silica.

900 gr of precipitated silica is used. 100 gr of 2-ethylhexanoyl choline ethyl sulfate powder is added. It is encapsulated by mixing at high revolutions in a rapid turbo-mixer at 2500 rpm for 10 minutes.

Example 35

Encapsulation preparation $(R_4)$N, N, N-trialkyl-alkyl(n)-ol-ammonium wherein $R^1$, $R^2$, $R^3$ are $CH_3$; n=2 and $OR^4$ is OH and the anion is chloride (choline chloride) at 10% in precipitated silica.

900 gr of precipitated silica is used. 100 gr of choline chloride powder is added. It is encapsulated by mixing at high revolutions in a rapid turbo-mixer at 2500 rpm for 10 minutes.

Example 36

Encapsulation preparation $(R_4)$N, N, N-trialkyl-alkyl(n)-ol-ammonium wherein $R^1$, $R^2$, $R^3$ are $CH_3$; n=2 and $OR^4$ is OH and the anion is ethyl sulfate (choline ethyl sulfate) at 10% in halloysite.

900 gr of halloysite is used. 100 gr of choline ethyl sulfate powder is added. It is encapsulated by mixing at high revolutions in a rapid turbo-mixer at 2500 rpm for 10 minutes.

Example A

Agglomerated stone-type material, without anti-static additive, an example which we take as comparative reference 1.

Homogeneous mass produced from 3 Kg of materials with the following composition expressed in percentage by weight:

Load formed by: micronised cristobalite 24%, crushed quartz 64% and titanium dioxide pigment 2%.

Agglomerant resin 10% formed by orthophthalic unsaturated polyester resin with: trimethoxysilyl propyl methacrylate (2% with respect to the resin), cumyl hydroperoxide (2% with respect to the resin).

The additives are added on the resin and are mixed and dispersed therein. The loads are mixed. The resin, with the additives thereof, is added on the load mixture and are homogenised in a planetary mixer. The mass is arranged on a mould, in the lower part of which kraft paper has been placed. It is pressed by means of vibro-compression and vacuum for 2 minutes. The mould is taken to an oven at a temperature of 120° C. for 40 minutes until the resin has polymerised. It is left to cool at room temperature and two days later it is demoulded, cut, polished and the thickness is calibrated.

Electric conductivity and resistance to bending tests are carried out with the following result:

| Example | Surface electric resistance | Resistance to bending | Appearance |
|---|---|---|---|
| A Comparative reference 1 | >1000 GOhm | 63 MPa | Shiny surface |

Example A0

Agglomerated stone-type material, with anti-static additive tetramethylammonium methyl sulfate (ACROS Organics), an example which we take as reference JPS63110242A.

Homogeneous mass produced from 3 Kg of materials with the following composition expressed in percentage by weight:

Load formed by: micronised cristobalite 23.85%, crushed quartz 64% and titanium dioxide pigment 2%.

Anti-static additive 0.15% with respect to the total and equivalent to 1.5% with respect to the agglomerant, this being tetramethylammonium methyl sulfate.

Agglomerant 10% formed by orthophthalic unsaturated polyester resin with: trimethoxysilyl propyl methacrylate (2% with respect to the resin), cumyl hydroperoxide (2% with respect to the resin).

The additives are added on the resin and are mixed and dispersed therein. The loads and anti-static additive are mixed. The resin, with the additives thereof, is added on the load and anti-static additive mixture and they are homogenised in a planetary mixer. The mass is arranged on a mould, in the lower part of which kraft paper has been placed. It is pressed by means of vibro-compression and vacuum for 2 minutes. The mould is taken to an oven at a temperature of 120° C. for 40 minutes until the resin has polymerised. It is left to cool at room temperature and two days later it is demoulded, cut, polished and the thickness is calibrated.

Electric conductivity and resistance to bending tests are carried out with the following result:

| Example | Surface electric resistance | Resistance to bending | Appearance |
|---|---|---|---|
| A0 Comparative reference 2 | 489 GOhm | 23 MPa | Dark oily patches on the surface |

Only a slight anti-static effect is produced, resistance to bending is lost, which means that the material is not valid for use as tiles, work tops, tables and other construction materials, dark patches appearing on the surface which make the chromatic possibilities of the material unusable.

Example B

Agglomerated stone-type material, with anti-static additive choline chloride, an example which we take as comparative reference.

Homogeneous mass produced from 3 Kg of materials with the following composition expressed in percentage by weight:

Load formed by: micronised cristobalite 23.85%, crushed quartz 64% and titanium dioxide pigment 2%.

Anti-static additive 0.15% with respect to the total and equivalent to 1.5% with respect to the agglomerant, this being pure choline chloride.

Agglomerant 10% formed by orthophthalic unsaturated polyester resin with: trimethoxysilyl propyl methacrylate (2% with respect to the resin), cumyl hydroperoxide (2% with respect to the resin).

The additives are added on the resin and are mixed and dispersed therein. The loads and anti-static additive are mixed. The resin, with the additives thereof, is added on the load and anti-static additive mixture and they are homogenised in a planetary mixer. The mass is arranged on a mould, in the lower part of which kraft paper has been placed. It is pressed by means of vibro-compression and vacuum for 2 minutes. The mould is taken to an oven at a temperature of 120° C. for 40 minutes until the resin has polymerised. It is left to cool at room temperature and two days later it is demoulded, cut, polished and the thickness is calibrated.

Electric conductivity and resistance to bending tests are carried out with the following result:

| Example | Surface electric resistance | Resistance to bending | Appearance |
|---|---|---|---|
| B Comparative reference 3 | 15 MOhm | 22 MPa | Dark oily patches on the surface |

Electric conductivity that is useful for the application of the material on floors or walls is achieved, but the mechanical characteristics and chromatic possibilities are lost.

Example C

Agglomerated stone-type material, with anti-static additive choline bromide, an example which we take as comparative reference.

Homogeneous mass produced from 3 Kg of materials with the following composition expressed in percentage by weight:

Load formed by: micronised cristobalite 23.95%, crushed quartz 64% and titanium dioxide pigment 2%.

Anti-static additive 0.05% with respect to the total and equivalent to 0.5% with respect to the agglomerant, this being pure choline bromide.

Agglomerant 10% formed by orthophthalic unsaturated polyester resin with: trimethoxysilyl propyl methacrylate (2% with respect to the resin), cumyl hydroperoxide (2% with respect to the resin).

The additives are added on the resin and are mixed and dispersed therein. The loads and anti-static additive are mixed. The resin, with the additives thereof, is added on the load and anti-static additive mixture and they are homogenised in a planetary mixer. The mass is arranged on a mould, in the lower part of which kraft paper has been placed. It is pressed by means of vibro-compression and vacuum for 2 minutes. The mould is taken to an oven at a temperature of 120° C. for 40 minutes until the resin has polymerised. It is left to cool at room temperature and two days later it is demoulded, cut, polished and the thickness is calibrated.

Electric conductivity and resistance to bending tests are carried out with the following result:

| Example | Electric resistance | Resistance to bending | Appearance |
|---|---|---|---|
| C Comparative reference 4 | 8 GOhm | 24 MPa | Dark oily patches on the surface |

Electric conductivity is limited and the mechanical properties and chromatic possibilities are lost, which means the material loses its possibilities of use.

Example D

Agglomerated stone-type material, with anti-static additive choline chloride encapsulated in sodium aluminosilicate according to EXAMPLE 1.

Homogeneous mass produced from 3 Kg of materials with the following composition expressed in percentage by weight:

Load formed by: micronised cristobalite 23%, crushed quartz 64% and titanium dioxide pigment 2%.

Anti-static additive 1% with respect to the total and equivalent to 10% with respect to the agglomerant, this encapsulant being choline chloride 5% in sodium aluminosilicate 95% according to EXAMPLE 1.

Agglomerant 10% formed by orthophthalic unsaturated polyester resin with: trimethoxysilyl propyl methacrylate (2% with respect to the resin), cumyl hydroperoxide (2% with respect to the resin).

The additives are added on the resin and are mixed and dispersed therein. The loads and anti-static additive are mixed. The resin, with the additives thereof, is added on the load and anti-static additive mixture and they are homogenised in a planetary mixer. The mass is arranged on a mould, in the lower part of which kraft paper has been placed. It is pressed by means of vibro-compression and vacuum for 2 minutes. The mould is taken to an oven at a temperature of 120° C. for 40 minutes until the resin has polymerised. It is left to cool at room temperature and two days later it is demoulded, cut, polished and the thickness is calibrated.

Electric conductivity and resistance to bending tests are carried out with the following result:

| Example | Electric resistance | Resistance to bending | Appearance |
|---|---|---|---|
| D | 14 GOhm | 44 MPa | Correct |

Example E

Agglomerated stone-type material, with anti-static additive choline chloride encapsulated in sodium aluminosilicate according to EXAMPLE 2.

Homogeneous mass produced from 3 Kg of materials with the following composition expressed in percentage by weight:

Load formed by: micronised cristobalite 23%, crushed quartz 64% and titanium dioxide pigment 2%.

Anti-static additive 1% with respect to the total and equivalent to 10% with respect to the agglomerant, this encapsulant being choline chloride 10% in sodium aluminosilicate 90% according to EXAMPLE 2.

Agglomerant 10% formed by orthophthalic unsaturated polyester resin with: trimethoxysilyl propyl methacrylate (2% with respect to the resin), cumyl hydroperoxide (2% with respect to the resin).

The additives are added on the resin and are mixed and dispersed therein. The loads and anti-static additive are mixed. The resin, with the additives thereof, is added on the load and anti-static additive mixture and they are homogenised in a planetary mixer. The mass is arranged on a mould, in the lower part of which kraft paper has been placed. It is pressed by means of vibro-compression and vacuum for 2 minutes. The mould is taken to an oven at a temperature of 120° C. for 40 minutes until the resin has polymerised. It is left to cool at room temperature and two days later it is demoulded, cut, polished and the thickness is calibrated.

Electric conductivity and resistance to bending tests are carried out with the following result:

| Example | Electric resistance | Resistance to bending | Appearance |
|---|---|---|---|
| E | 500 MOhm | 41 MPa | Correct |

Example F

Agglomerated stone-type material, with anti-static additive choline chloride encapsulated in sodium aluminosilicate according to EXAMPLE 3.

Homogeneous mass produced from 3 Kg of materials with the following composition expressed in percentage by weight:

Load formed by: micronised cristobalite 23%, crushed quartz 64% and titanium dioxide pigment 2%.

Anti-static additive 1% with respect to the total and equivalent to 10% with respect to the agglomerant, this encapsulant being choline chloride 15% in sodium aluminosilicate 85% according to EXAMPLE 3.

Agglomerant 10% formed by orthophthalic unsaturated polyester resin with: trimethoxysilyl propyl methacrylate (2% with respect to the resin), cumyl hydroperoxide (2% with respect to the resin).

The additives are added on the resin and are mixed and dispersed therein. The loads and anti-static additive are mixed. The resin, with the additives thereof, is added on the load and anti-static additive mixture and they are homogenised in a planetary mixer. The mass is arranged on a mould, in the lower part of which kraft paper has been placed. It is pressed by means of vibro-compression and vacuum for 2 minutes. The mould is taken to an oven at a temperature of 120° C. for 40 minutes until the resin has polymerised. It is left to cool at room temperature and two days later it is demoulded, cut, polished and the thickness is calibrated.

Electric conductivity and resistance to bending tests are carried out with the following result:

| Example | Electric resistance | Resistance to bending | Appearance |
|---|---|---|---|
| F | 80 MOhm | 41 MPa | Correct |

Example G

Agglomerated stone-type material, with anti-static additive choline bromide encapsulated in sepiolite according to EXAMPLE 4.

Homogeneous mass produced from 3 Kg of materials with the following composition expressed in percentage by weight:

Load formed by: micronised cristobalite 23%, crushed quartz 64% and titanium dioxide pigment 2%.

Anti-static additive 1% with respect to the total and equivalent to 10% with respect to the agglomerant, this encapsulant being choline bromide 10% in sepiolite 90% according to EXAMPLE 4.

Agglomerant 10% formed by orthophthalic unsaturated polyester resin with: trimethoxysilyl propyl methacrylate (2% with respect to the resin), cumyl hydroperoxide (2% with respect to the resin).

The additives are added on the resin and are mixed and dispersed therein. The loads and anti-static additive are mixed. The resin, with the additives thereof, is added on the load and anti-static additive mixture and they are homogenised in a planetary mixer. The mass is arranged on a mould, in the lower part of which kraft paper has been placed. It is pressed by means of vibro-compression and vacuum for 2 minutes. The mould is taken to an oven at a temperature of 120° C. for 40 minutes until the resin has polymerised. It is left to cool at room temperature and two days later it is demoulded, cut, polished and the thickness is calibrated.

Electric conductivity and resistance to bending tests are carried out with the following result:

| Example | Electric resistance | Resistance to bending | Appearance |
| --- | --- | --- | --- |
| G | 680 MOhm | 32 MPa | Correct |

Several comparative examples are carried out with additions of 1% of anti-static additive with respect to the total of the mass and equivalent to 10% with respect to the agglomerant, prepared in different encapsulants in a ratio of 10% of the salt indicated and 90% of encapsulant.

The form of preparation is identical to that set forth above in example F and the results are presented below:

| EXAMPLE | ANTI-STATIC ADDITIVE | SALT 10% | ENCAPSULANT 90% | SURFACE RESISTANCE | RESISTANCE TO BENDING | SURFACE APPEARANCE |
| --- | --- | --- | --- | --- | --- | --- |
| H | Example 5 | Choline chloride | Attapulgite | 384 MOhm | 29 | Correct |
| I | Example 6 | Choline chloride | Halloysite | 291 MOhm | 34 | Correct |
| J | Example 7 | Choline formate | Stevensite-kerolite | 895 MOhm | 27 | Slight loss of shine |
| K | Example 8 | Choline acetate | Activated Na bentonite | 889 MOhm | 26 | Slight loss of shine |
| L | Example 9 | Choline acetate | Calcium bentonite | 982 MOhm | 28 | Slight loss of shine |
| M | Example 10 | Choline methanesulfonate | Ball clay | 352 MOhm | 29 | Slight loss of shine |
| N | Example 11 | Choline chloride | Micronised Kaolin | 258 MOhm | 26 | Slight loss of shine |
| O | Example 12 | Choline chloride | Metakaolin | 267 MOhm | 28 | Slight loss of shine |
| P | Example 13 | Choline chloride | Zeolite A | 689 MOhm | 33 | Correct |
| Q | Example 14 | Choline chloride | Alumina | 572 MOhm | 26 | Slight loss of shine |
| R | Example 15 | Choline chloride | Boehmite | 567 MOhm | 26 | Slight loss of shine |
| S | Example 16 | Choline chloride | Aluminium trihydroxide | 421 MOhm | 29 | Slight loss of shine |
| T | Example 17 | Stearoyl choline chloride | Calcium carbonate | 745 MOhm | 24 | Slight loss of shine |
| U | Example 18 | Acetylcholine bromide | Sodium aluminosilicate and Halloysite | 623 MOhm | 38 | Correct |
| V | Example 19 | Choline chloride | Precipitated silica | 496 MOhm | 26 | Slight loss of shine |
| W | Example 20 | Choline chloride | Titanium dioxide | 569 MOhm | 28 | Slight loss of shine |
| X | Example 21 | Choline chloride | Magnesium hydroxide | 556 MOhm | 29 | Slight loss of shine |
| Y | Example 22 | Choline bromide | Magnesium hydroxide | 731 MOhm | 24 | Correct |
| Z | Example 23 | Choline ethyl sulfate | Magnesium hydroxide | 477 MOhm | 39 | Slight loss of shine |
| AA | Example 24 | Choline methyl sulfate | Zeolite A | 372 MOhm | 36 | Slight loss of shine |
| AB | Example 25 | Choline tetrafluoroborate | Calcium carbonate | 450 MOhm | 37 | Slight loss of shine |
| AC | Example 26 | Choline acetate | Calcium carbonate | 931 MOhm | 37 | Slight loss of shine |
| AD | Example 27 | Choline lactate | Precipitated silica | 898 MOhm | 35 | Slight loss of shine |
| AE | Example 28 | Choline saccharinate | Precipitated silica | 746 MOhm | 39 | Slight loss of shine |
| AF | Example 29 | Acetylcholine chloride | Precipitated silica | 3 GOhm | 38 | Slight loss of shine |

Example AG

Agglomerated stone-type material, with anti-static additive choline bromide encapsulated in precipitated silica according to EXAMPLE 32.

Homogeneous mass produced from 3 Kg of materials with the following composition expressed in percentage by weight:

Load formed by: ground quartz 20%, crushed quartz 64% and titanium dioxide pigment 5%.

Anti-static additive 1% with respect to the total and equivalent to 10% with respect to the agglomerant, this encapsulant being choline bromide 10% in precipitated silica 90% according to EXAMPLE 32.

Agglomerant 10% formed by orthophthalic unsaturated polyester resin with: trimethoxysilyl propyl methacrylate (2% with respect to the resin), cumyl hydroperoxide (2% with respect to the resin).

The additives are added on the resin and are mixed and dispersed therein. The loads and anti-static additive are mixed. The resin, with the additives thereof, is added on the load and anti-static additive mixture and they are homogenised in a planetary mixer. The mass is arranged on a mould, in the lower part of which kraft paper has been placed. It is pressed by means of vibro-compression and vacuum for 2 minutes. The mould is taken to an oven at a temperature of 120° C. for 40 minutes until the resin has polymerised. It is left to cool at room temperature and two days later it is demoulded, cut, polished and the thickness is calibrated.

Electric conductivity and resistance to bending tests are carried out with the following result:

| Example | Electric resistance | Resistance to bending | Appearance |
|---|---|---|---|
| AG | 992 MOhm | 44 MPa | Correct |

Example AH

Agglomerated stone-type material, with anti-static additive choline chloride encapsulated in sodium aluminosilicate according to EXAMPLE 3.

Homogeneous mass produced from 3 Kg of materials with the following composition expressed in percentage by weight:

Load formed by: ground quartz 23%, crushed quartz 64% and titanium dioxide pigment 2% of the total.

Anti-static additive 1% with respect to the total and equivalent to 10% with respect to the agglomerant, this encapsulant being choline chloride 15% in sodium aluminosilicate 85% according to EXAMPLE 3.

Agglomerant 10% of the total formed by orthophthalic unsaturated polyester resin with: trimethoxysilyl propyl acrylate (2% with respect to the resin), cumyl hydroperoxide (2% with respect to the resin).

The additives are added on the resin and are mixed and dispersed therein. The loads and anti-static additive are mixed. The resin, with the additives thereof, is added on the load and anti-static additive mixture and they are homogenised in a planetary mixer. The mass is arranged on a mould, in the lower part of which kraft paper has been placed. It is pressed by means of vibro-compression and vacuum for 2 minutes. The mould is taken to an oven at a temperature of 120° C. for 40 minutes until the resin has polymerised. It is left to cool at room temperature and two days later it is demoulded, cut, polished and the thickness is calibrated.

Electric conductivity and resistance to bending tests are carried out with the following result:

| Example | Electric resistance | Resistance to bending | Appearance |
|---|---|---|---|
| AH | 170 MOhm | 55 MPa | Correct |

Example AI

Agglomerated stone-type material, with anti-static additive acetylcholine ethyl sulfate encapsulated in halloysite according to EXAMPLE 33.

Homogeneous mass produced from 3 Kg of materials with the following composition expressed in percentage by weight:

Load formed by: ground quartz 23%, crushed quartz 64% and titanium dioxide pigment 2% of the total.

Anti-static additive 1% with respect to the total and equivalent to 10% with respect to the agglomerant, this encapsulant being acetylcholine ethyl sulfate 10% in halloysite 90% according to EXAMPLE 33.

Agglomerant 10% of the total, formed by epoxy vinyl ester resin with: trimethoxysilyl propyl methacrylate (2% with respect to the resin), cumyl hydroperoxide (2% with respect to the resin).

The additives are added on the resin and are mixed and dispersed therein to form the agglomerant. The loads and anti-static additive are mixed. The resin, with the additives thereof, is added on the load and anti-static additive mixture and they are homogenised in a planetary mixer. The mass is arranged on a mould, in the lower part of which kraft paper has been placed. It is pressed by means of vibro-compression and vacuum for 2 minutes. The mould is taken to an oven at a temperature of 120° C. for 40 minutes until the resin has polymerised. It is left to cool at room temperature and two days later it is demoulded, cut, polished and the thickness is calibrated.

Electric conductivity and resistance to bending tests are carried out with the following result:

| Example | Electric resistance | Resistance to bending | Appearance |
|---|---|---|---|
| AI | 932 MOhm | 32 MPa | Slight loss of surface shine |

Example AJ

Agglomerated stone-type material, with anti-static additive 2-ethylhexanoyl choline ethyl sulfate encapsulated in precipitated silica according to EXAMPLE 2.

Homogeneous mass produced from 3 Kg of materials with the following composition expressed in percentage by weight:

Load formed by: ground quartz 23%, crushed quartz 64% and titanium dioxide pigment 2%.

Anti-static additive 1% with respect to the total and equivalent to 10% with respect to the agglomerant, this encapsulant being acetylcholine ethyl sulfate 10% in precipitated silica 90% according to EXAMPLE 34.

Agglomerant 10% of the total, formed by unsaturated polyester resin in diluent, 25% styrene and 10% butyl methacrylate with: trimethoxysilyl propyl methacrylate (2% with respect to the resin), cumyl hydroperoxide (2% with respect to the resin).

The additives are added on the resin and are mixed and dispersed therein to form the agglomerant. The loads and anti-static additive are mixed. The resin, with the additives thereof, is added on the load and anti-static additive mixture and they are homogenised in a planetary mixer. The mass is arranged on a mould, in the lower part of which kraft paper has been placed. It is pressed by means of vibro-compression and vacuum for 2 minutes. The mould is taken to an oven at a temperature of 120° C. for 40 minutes until the resin has polymerised. It is left to cool at room temperature and two days later it is demoulded, cut, polished and the thickness is calibrated.

Electric conductivity and resistance to bending tests are carried out with the following result:

| Example | Electric resistance | Resistance to bending | Appearance |
|---|---|---|---|
| AJ | 923 MOhm | 36 MPa | Correct |

Example AK

Agglomerated stone-type material, with anti-static additive choline chlorine encapsulated in precipitated silica according to EXAMPLE 35.

Homogeneous mass produced from 3 Kg of materials with the following composition expressed in percentage by weight:

Load formed by: ground albite-type feldspar 23%, crushed quartz 64% and titanium dioxide pigment 2%.

Anti-static additive 1% with respect to the total and equivalent to 10% with respect to the agglomerant, this encapsulant being choline chlorine 10% in precipitated silica 90% according to EXAMPLE 35.

Agglomerant 10% of the total, formed by dicyclopentadiene unsaturated polyester resin with: trimethoxysilyl propyl methacrylate (2% with respect to the resin), cumyl hydroperoxide (2% with respect to the resin).

The additives are added on the resin and are mixed and dispersed therein to form the agglomerant. The loads and anti-static additive are mixed.

The resin, with the additives thereof, is added on the load and anti-static additive mixture and they are homogenised in a planetary mixer. The mass is arranged on a mould, in the lower part of which kraft paper has been placed. It is pressed by means of vibro-compression and vacuum for 2 minutes. The mould is taken to an oven at a temperature of 120° C. for 40 minutes until the resin has polymerised. It is left to cool at room temperature and two days later it is demoulded, cut, polished and the thickness is calibrated.

Electric conductivity and resistance to bending tests are carried out with the following result:

| Example | Electric resistance | Resistance to bending | Appearance |
|---|---|---|---|
| AK | 763 MOhm | 31 MPa | Correct |

Example AL

Agglomerated stone-type material, with anti-static additive $(R_4)N,N,N$-trialkyl-alkyl-ol-ammonium wherein $R^1$, $R^2$, $R^3$ are $CH_2CH_3$; n=2 and $OR^4$ is OH and the anion is chloride encapsulated in sepiolite according to EXAMPLE 30.

Homogeneous mass produced from 3 Kg of materials with the following composition expressed in percentage by weight:

Load formed by: ground quartz 20%, crushed quartz 64% and titanium dioxide pigment 5%.

Anti-static additive 1% with respect to the total and equivalent to 10% with respect to the agglomerant, this encapsulant being $(R_4)N,N,N$-trialkyl-alkyl-ol-ammonium wherein $R^1$, $R^2$, $R^3$ are $CH_2CH_3$; n=2 and $OR^4$ is OH and the anion is chloride, at 10% in sepiolite 90% according to EXAMPLE 30.

Agglomerant 10% formed by orthophthalic unsaturated polyester resin with: trimethoxysilyl propyl methacrylate (2% with respect to the resin), cumyl hydroperoxide (2% with respect to the resin).

The additives are added on the resin and are mixed and dispersed therein. The loads and anti-static additive are mixed. The resin, with the additives thereof, is added on the load and anti-static additive mixture and they are homogenised in a planetary mixer. The mass is arranged on a mould, in the lower part of which kraft paper has been placed. It is pressed by means of vibro-compression and vacuum for 2 minutes. The mould is taken to an oven at a temperature of 120° C. for 40 minutes until the resin has polymerised. It is left to cool at room temperature and two days later it is demoulded, cut, polished and the thickness is calibrated.

Electric conductivity and resistance to bending tests are carried out with the following result:

| Example | Electric resistance | Resistance to bending | Appearance |
|---|---|---|---|
| AL | 96 GOhm | 36 MPa | Slight loss of surface shine |

Example AM

Agglomerated stone-type material, with anti-static additive $(R_4)N,N,N$-trialkyl-alkyl-ol-ammonium wherein $R^1$, $R^2$, $R^3$ are $CH_2CH_2CH_3$; n=2 and $OR^4$ is OH and the anion is chloride at 10% encapsulated in sepiolite according to EXAMPLE 31.

Homogeneous mass produced from 3 Kg of materials with the following composition expressed in percentage by weight:

Load formed by: ground quartz 20%, crushed quartz 64% and titanium dioxide pigment 5%.

Anti-static additive 1% with respect to the total and equivalent to 10% with respect to the agglomerant, this encapsulant being $(R_4)N,N,N$-trialkyl-alkyl-ol-ammonium wherein $R^1$, $R^2$, $R^3$ are $CH_2CH_2CH_3$; n=2 and $OR^4$ is OH and the anion is chloride, at 10% in sepiolite 90% according to EXAMPLE 31.

Agglomerant 10% formed by orthophthalic unsaturated polyester resin with: trimethoxysilyl propyl methacrylate (2% with respect to the resin), cumyl hydroperoxide (2% with respect to the resin).

The additives are added on the resin and are mixed and dispersed therein. The loads and anti-static additive are mixed. The resin, with the additives thereof, is added on the load and anti-static additive mixture and they are homogenised in a planetary mixer. The mass is arranged on a mould, in the lower part of which kraft paper has been placed. It is pressed by means of vibro-compression and vacuum for 2 minutes. The mould is taken to an oven at a temperature of 120° C. for 40 minutes until the resin has polymerised. It is left to cool at room temperature and two days later it is demoulded, cut, polished and the thickness is calibrated.

Electric conductivity and resistance to bending tests are carried out with the following result:

| Example | Electric resistance | Resistance to bending | Appearance |
| --- | --- | --- | --- |
| AM | 308 GOhm | 39 MPa | Slight loss of surface shine |

Example AN

Gel coat-type material, with anti-static additive choline chloride without encapsulation. Homogeneous mass produced in an amount of 1 Kg in total, with the following composition expressed in percentage by weight and added in the following order:

| Addition order | Component | Percentage by weight |
| --- | --- | --- |
| 1 | Neopentyl glycol unsaturated polyester resin | 35.00 |
| 2 | BYK-A-555 de-aerator by BYK | 0.50 |
| 3 | Tetrahydroquinone | 0.25 |
| 4 | Silica fume Aerosil 200 by Evonik | 1.00 |
| 5 | Halloysite | 3.4 |
| 6 | Choline chloride | 0.6 |
| 7 | Neopentyl glycol unsaturated polyester resin | 18.00 |
| 8 | Styrene | 15.00 |
| 9 | Tinuvin 123 UV protector by BASF | 0.50 |
| 10 | Cobalt activator | 0.25 |
| 11 | Potassium ethylhexanoate | 0.15 |
| 12 | Dimethylacetoacetamide | 0.25 |
| 13 | BYK-A-555 de-aerator by BYK | 0.50 |
| 14 | Methyl methacrylate | 8.75 |
| 15 | Trimethylolpropane trimethacrylate | 3.00 |
| 16 | De-aerator silicone | 0.10 |
| 17 | Phthalocyanine Blue at 10% in unsaturated polyester, dying paste | 13.00 |
| 18 | MEK peroxide | 2 parts per 100 of polyester resin |

As the components are added in the order indicated in the table above, the mass that forms is stirred at 250 rpm with a cowles stirrer. After component 17 is added, stirring continues for 30 mins until the material forms. Lastly, component 18, the peroxide activator, is added and stirred for 3 mins.

The material is deposited on a silicone mould and a thickness of 0.5 mm is obtained. When it has polymerised and 5 days have passed, the surface resistance is measured.

| Example | Electric resistance | Appearance |
| --- | --- | --- |
| AN | 75 MOhm | Dark patches appear in areas |

Example AO

Gel coat-type material, with anti-static additive choline chloride encapsulated in halloysite according to EXAMPLE 3.

Homogeneous mass produced in an amount of 1 Kg in total, with the following composition expressed in percentage by weight and added in the following order:

| Addition order | Component | Percentage by weight |
| --- | --- | --- |
| 1 | Neopentyl glycol unsaturated polyester resin | 35.00 |
| 2 | BYK-A-555 de-aerator by BYK | 0.50 |
| 3 | Tetrahydroquinone | 0.25 |
| 4 | Silica fume Aerosil 200 by Evonik | 1.00 |
| 5 | Anti-static additive encapsulated according to example 3 formed by choline chloride 15% encapsulated in halloysite 85% | 4.00 |
| 6 | Neopentyl glycol unsaturated polyester resin | 18.00 |
| 7 | Styrene | 15.00 |
| 8 | Tinuvin 123 UV protector by BASF | 0.50 |
| 9 | Cobalt activator | 0.25 |
| 10 | Potassium ethylhexanoate | 0.15 |
| 11 | Dimethylacetoacetamide | 0.25 |
| 12 | BYK-A-555 de-aerator by BYK | 0.50 |
| 13 | Methyl methacrylate | 8.75 |
| 14 | Trimethylolpropane trimethacrylate | 3.00 |
| 15 | De-aerator silicone | 0.10 |
| 16 | Phthalocyanine Blue at 10% in unsaturated polyester, dying paste | 13.00 |
| 17 | MEK peroxide | 2 parts per 100 of polyester resin |

As the components are added in the order indicated in the table above, the mass that forms is stirred at 2000 rpm with a cowles stirrer. After component 16 is added, stirring continues for 30 mins until the material forms. Lastly, component 17, the peroxide activator, is added and stirred for 3 mins.

The material is deposited on a silicone mould in a thickness of 0.5 mm. When it has polymerised and 5 days have passed, the surface resistance is measured.

| Example | Electric resistance | Appearance |
| --- | --- | --- |
| AO | 87 MOhm | Correct |

Example AP

Gel coat-type material, with anti-static additive choline chloride without encapsulation. Homogeneous mass produced in an amount of 1 Kg in total, with the following composition expressed in percentage by weight and added in the following order:

| Addition order | Component | Percentage by weight |
| --- | --- | --- |
| 1 | Isophthalic unsaturated polyester resin | 20 |
| 2 | BYK-A-555 de-aerator by BYK | 0.25 |
| 3 | Tetrahydroquinone | 0.25 |
| 4 | Silica fume Aerosil 200 by Evonik | 1 |
| 5 | Precipitated sodium aluminosilicate | 1.7 |
| 6 | Choline chloride | 0.3 |
| 7 | Tinuvin 123 UV protector by BASF | 0.5 |
| 8 | Cobalt activator | 0.25 |
| 9 | Potassium ethylhexanoate | 0.15 |

-continued

| Addition order | Component | Percentage by weight |
|---|---|---|
| 10 | Dimethylacetoacetamide | 0.25 |
| 11 | Methyl methacrylate | 6.5 |
| 12 | Trimethylol propane trimethacrylate | 3 |
| 13 | De-aerator silicone | 0.1 |
| 14 | Trimethoxysilylpropyl methacrylate | 1.5 |
| 15 | Alumina 1-100 μm | 64.25 |
| 16 | MEK peroxide | 2 parts per 100 of polyester resin |

As the components are added in the order indicated in the table above, the mass that forms is stirred at 250 rpm with a cowles stirrer. After component 15 is added, stirring continues for 30 mins until the material forms. Lastly, component 16, the peroxide activator, is added and stirred for 3 mins.

The material is deposited on a silicone mould in a layer that is 0.5 mm thick. When it has polymerised and 5 days have passed, the surface resistance is measured.

| Example | Electric resistance | Appearance |
|---|---|---|
| AP | 154 MOhm | Darkening patches are seen in some areas and the material loses shine. |

Example AQ

Gel coat-type material, with anti-static additive choline chloride encapsulated in sodium aluminosilicate according to EXAMPLE 3.

Homogeneous mass produced in an amount of 1 Kg in total, with the following composition expressed in percentage by weight and added in the following order:

| Addition order | Component | Percentage by weight |
|---|---|---|
| 1 | Isophthalic unsaturated polyester resin | 20 |
| 2 | BYK-A-555 de-aerator by BYK | 0.25 |
| 3 | Tetrahydroquinone | 0.25 |
| 4 | Silica fume Aerosil 200 by Evonik | 1 |
| 5 | Anti-static additive encapsulated according to example 3 formed by choline chloride 15% encapsulated in sodium aluminosilicate 85% | 2 |
| 6 | Tinuvin 123 UV protector by BASF | 0.5 |
| 7 | Cobalt activator | 0.25 |
| 8 | Potassium ethylhexanoate | 0.15 |
| 9 | Dimethylacetoacetamide | 0.25 |
| 10 | Methyl methacrylate | 6.5 |
| 11 | Trimethylolpropane trimethacrylate | 3 |
| 12 | Demoulding silicone | 0.1 |
| 13 | Trimethoxysilylpropyl methacrylate | 1.5 |
| 14 | Alumina 1-100 um | 61.50 |
| 15 | MEK peroxide | 2 parts per 100 of polyester resin |

As the components are added in the order indicated in the table above, the mass that forms is stirred at 2000 rpm with a cowles stirrer. After component 14 is added, stirring continues for 30 mins until the material forms. Lastly, component 15, the peroxide activator, is added and stirred for 3 mins.

The material is deposited on a silicone mould to obtain a layer that is 0.5 mm thick. When it has polymerised and 5 days have passed, the surface resistance is measured.

| Example | Electric resistance | Appearance |
|---|---|---|
| AQ | 211 MOhm | Correct |

Example AR

Material produced by Bulk Moulding Composite (BMC) technique, with addition of choline ethyl sulfate without encapsulation.

First, the resin formed by three components is prepared: unsaturated polyester diluted in styrene 65%, low profile polyvinyl acetate additive diluted in styrene 4% and styrene 31% to obtain 5 Kg of material. The unsaturated polyester is a diluted orthophthalic resin containing 35% styrene. The low profile additive is a polyvinyl acetate solution containing 60% styrene, which are mixed in a tank with a cowles blade at 200 rpm for 10 mins.

5 Kg is produced in which for every 100 parts of the previous mixture the following are added in parts:

| Addition order | Component | Parts per 100 of resin (phr) |
|---|---|---|
| 1 | Previous initial mixture of polyester resin, low profile additive and styrene | 100 |
| 2 | PBQ inhibitor at 6% | 0.3 |
| 3 | Calcium carbonate | 200 |
| 4 | Halloysite | 8.5 |
| 5 | Choline ethyl sulfate | 1.5 |
| 6 | Demoulding zinc stearate | 5 |
| 7 | Phthalocyanine Blue at 10% in unsaturated polyester, dying paste | 2 |
| 8 | Trigonox C | 1.25 |
| 9 | Trigonox 21 | 0.25 |
| 10 | Cut glass fibre | 45 |

The material is mixed in a kneader for 10 mins. The cut glass fibre is added and it is mixed for 1 min. The material is moulded for 3 mins at 150° C. and 7 MPa of pressure. Pieces that are 150×150 mm and 3 mm thick are obtained

| Example | Electric resistance | Bending modulus | Appearance |
|---|---|---|---|
| AR | 320 MOhm | 7.2 GPa | Dark patches appear |

Example AS

Material produced by Bulk Moulding Composite (BMC) technique, with addition of choline ethyl sulfate at 15% encapsulated in halloysite according to example 36.

First, the resin formed by three components is prepared: unsaturated polyester diluted in styrene 65%, low profile polyvinyl acetate additive diluted in styrene 4% and styrene 31% to obtain 5 Kg of material. The unsaturated polyester is a diluted orthophthalic resin containing 35% of styrene. The low profile additive is a polyvinyl acetate solution containing 60% of styrene, which are mixed in a tank with a cowles blade at 200 rpm for 10 mins.

5 Kg is produced in which for every 100 parts of the previous mixture the following are added in parts:

| Addition order | Component | Parts per 100 of resin (phr) |
|---|---|---|
| 1 | Previous initial mixture of polyester resin, low profile additive and styrene | 100 |
| 2 | PBQ inhibitor at 6% | 0.3 |
| 3 | Calcium carbonate | 200 |
| 4 | Choline chloride at 15% encapsulated in sodium aluminosilicate according to example 3 | 10 |
| 5 | Demoulding zinc stearate | 5 |
| 6 | Phthalocyanine Blue at 10% in unsaturated polyester, dying paste | 2 |
| 7 | Trigonox C | 1.25 |
| 8 | Trigonox 21 | 0.25 |
| 9 | Cut glass fibre | 45 |

The material is mixed in a kneader for 10 mins. The cut glass fibre is added and it is mixed for 1 min. The material is moulded for 3 mins at 150° C. and 7 MPa of pressure. Pieces that are 150×150 mm and 3 mm thick are obtained.

| Example | Electric resistance | Bending modulus | Appearance |
|---|---|---|---|
| AS | 402 MOhm | 8.9 GPa | Correct shine |

Example AT

Material produced by Sheet Moulding Composite (SMC) technique, with addition of choline ethyl sulfate without encapsulation.

The components of the resin are prepared in an amount of 10 Kg in the following addition order in a mixer:

| Addition order | Component | Parts per 100 of resin (phr) |
|---|---|---|
| 1 | Orthophthalic unsaturated polyester resin | 100 |
| 2 | Styrene | 5 |
| 3 | Polyethylene powder | 5 |
| 4 | Zinc stearate | 5 |
| 5 | Phthalocyanine Blue at 10% in unsaturated polyester, dying paste | 5 |
| 6 | Calcium carbonate | 160 |
| 7 | Halloysite | 8.5 |
| 8 | Choline ethyl sulfate powder | 1.5 |
| 9 | Trigonox C peroxide | 1.5 |
| 10 | Magnesium oxide paste | 3 |
| 11 | Cut glass fibre 25 mm | 100 |

Components 1 to 10 are mixed in a mixer with a cowles blade at 200 rpm for 10 mins. The material is deposited on a polyethylene film and spread. The cut glass fibre is added. A top sealing film is placed and it is passed through a double roller. The material formed is left to mature for 4 weeks. The material is moulded for 3 mins at 150° C. and 50 Kg/cm² of pressure. Pieces that are 150×150 mm and 3 mm thick are obtained.

| Example | Electric resistance | Resistance to bending | Appearance |
|---|---|---|---|
| AT | 28 MOhm | 160 MPa | Dark oily patches on the surface |

Example AU

Material produced by Sheet Moulding Composite (SMC) technique, with addition of choline ethyl sulfate encapsulated in halloysite according to EXAMPLE 36.

The components of the resin are prepared in an amount of 10 Kg in the following addition order in a mixer:

| Addition order | Component | Parts per 100 of resin (phr) |
|---|---|---|
| 1 | Orthophthalic unsaturated polyester resin | 100 |
| 2 | Styrene | 5 |
| 3 | Polyethylene powder | 5 |
| 4 | Zinc stearate | 5 |
| 5 | Phthalocyanine Blue at 10% in unsaturated polyester, dying paste | 5 |
| 6 | Calcium carbonate | 160 |
| 7 | Choline ethyl sulfate encapsulant at 15% in halloysite at 85% according to example 36 | 10 |
| 8 | Trigonox C peroxide | 1.5 |
| 9 | Magnesium oxide paste | 3 |
| 10 | Cut glass fibre 25 mm | 100 |

Components 1 to 9 are mixed in a mixer with a cowles blade at 200 rpm for 10 mins. The material is deposited on a polyethylene film and spread. The cut glass fibre is added. A top sealing film is placed and it is passed through a double roller. The material formed is left to mature for 4 weeks. The material is moulded for 3 mins at 150° C. and 50 Kg/cm² of pressure. Pieces that are 150×150 mm and 3 mm thick are obtained.

| Example | Electric resistance | Resistance to bending | Appearance |
|---|---|---|---|
| AU | 89 MOhm | 220 MPa | Correct shine |

The invention claimed is:

1. A formulation free of conductive polymers, metals, carbon-based conductive materials, which provides an antistatic and/or electric charge dissipation effect in an application thereof in a polymer matrix selected from thermostable unsaturated polyester resins or in thermostable epoxy vinyl ester resins and wherein the presence of two components is necessary so that the first component can disperse in the polymer matrix thus preventing a loss of mechanical and aesthetic properties, also preventing formation of agglomerates or reaction with the polymeric matrix, the formulation comprising:

a. the first component: a compound based on a cation and an anion A, as expressed in the following chemical formula:

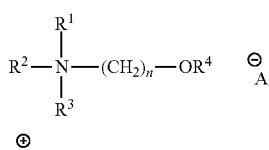

R¹, R² and R³ = —CH₃ or —CH₂CH₃,
n=1, 2 or 3
OR⁴=hydroxyl, formyl, acetyl or propanoyl,
The anion, A, is inorganic or organic, selected from: chloride, fluoride, bromide, iodide, perchlorate, sulphate, hydrogen sulphate, nitrate, nitrite, dihydrogen phosphate, hydrogen phosphate, phosphate, borate, carbonate, hydrogen carbonate, sulphocyanide, tetrafluoroborate, hexafluorophosphate, dicyanamide, sulfamate, acetate, propionate, butanoate, formate, oxalate, lactate, glycolate, benzoate, salicylate, citrate, tartrate, p-toluenesulfonate, xylenesulfonate, 2-ethylhexyl sulfate, octanesulfonate, methanesulfonate, ethanesulfonate, propanesulfonate, methosulfate (methyl sulfate), ethosulfate (ethyl sulfate), alkyl phosphates, aryl phosphates or saccharinate b. the second component: a support that encapsulates, absorbs, adsorbs, serves as a solid dispersing agent and/or protects the previous anion-cation group (salt) comprised among the following: sodium aluminosilicate, precipitated silica, silica fume, sepiolite, attapulgite, stevensite-kerolite, bentonite, ball clay, kaolinite, kaolin, metakaolin, halloysite, TiO₂, alumina (Al₂O₃), boehmite, aluminium trihydroxide, magnesium hydroxide, magnesium oxide, calcium carbonate, magnesium carbonate, calcium and magnesium carbonate and/or the mixtures thereof.

2. The formulation according to claim 1, wherein the groups R¹, R², R³ are —CH₃.

3. The formulation according to claim 1, wherein n is 2.

4. The formulation according to claim 1, wherein the support that encapsulates, absorbs, adsorbs, serves as a solid dispersing agent and/or protects the previous anion-cation group (salt) has the following characteristics and is comprised among: precipitated silica with BET between 30 and 250 m²/gr, silica fume 200-300 m²/gr, sodium aluminosilicate (10 to 200 m²/gr), sepiolite 0.01-100 μm, attapulgite 0.01-100 μm, stevensite-kerolite 0.01-100 μm, bentonites 0.01-100 μm, ball clay, kaolinite 0.01-100 μm, kaolin 0.01-100 μm, metakaolin 0.1-100 μm, halloysite, TiO₂ 0.01-100 μm, alumina 0.01-100 μm, boehmite 0.01-100 μm, aluminium trihydroxide 0.01-100 μm, magnesium hydroxide 0.01-100 μm, magnesium oxide 0.01-100 μm, calcium carbonate 0.01-100 μm, magnesium carbonate 0.01-100 μm, calcium and magnesium carbonate 0.01-100 μm and/or the mixtures thereof.

5. The formulation according to claim 4, wherein the porous material is found among: sodium aluminosilicate 10 to 200 m²/gr, precipitated silica with BET between 30 and 250 m²/gr, halloysite, and/or the mixtures thereof.

6. The formulation according to claim 4, wherein the porous material is sodium aluminosilicate with a composition 10 to 14.5 (SiO₂), 0.5 to 1.5 (Al₂O₃), 0.5 to 2 (Na₂O) and surface BET 50 to 90 m²/gr.

7. The formulation according to claim 1, wherein the OR⁴ group is OH (hydroxyl).

8. The formulation according to claim 1, wherein the anion is selected from chloride, bromide, fluoride, methosulfate (methyl sulfate), ethosulfate (ethyl sulfate), saccharinate, perchlorate or nitrate.

9. The formulation according to claim 1, wherein the anion is selected from chloride, bromide, saccharinate, methosulfate (methyl sulfate) or ethosulfate (ethyl sulfate).

10. The formulation according to claim 1, wherein the ratio between the support material, second component, and the salt, first component, is comprised in the range of 1 to 40% by mass.

11. The formulation according to claim 1, wherein the ratio between the support material, second component, and the salt, first component, is comprised in the range of 10 and 20% by mass.

12. A composition comprises the formulation according to claim 1 and an unsaturated polyester or epoxy vinyl ester resin wherein the ratio between the formulation and the unsaturated polyester or epoxy vinyl ester resin is from 1% to 19% per amount of resin.

13. The composition according to claim 12, wherein the ratio between the formulation and the unsaturated polyester or epoxy vinyl ester resin is from 5 to 10% per amount of resin.

14. A method of making an agglomerated stone composite material comprising using the formulation of claim 1, which enables the production of panels, blocks or tiles with anti-static and/or electric charge dissipation properties.

15. A method of making a SMC material comprising using the formulation of claim 1, which enables the production of panels with anti-static and/or electric charge dissipation properties.

16. A method of making a BMC material comprising using the formulation of claim 1, which enables the production of panels with anti-static and/or electric charge dissipation properties.

17. A method of making a gel coat composite material comprising using the formulation of claim 1, which enables the production of panels with anti-static and/or electric charge dissipation properties.

* * * * *